Feb. 15, 1949.  W. McK. MARTIN ET AL  2,461,559
APPARATUS FOR WASHING THE SIDE SEAMS OF CAN BODIES
Filed Dec. 13, 1943  2 Sheets-Sheet 1
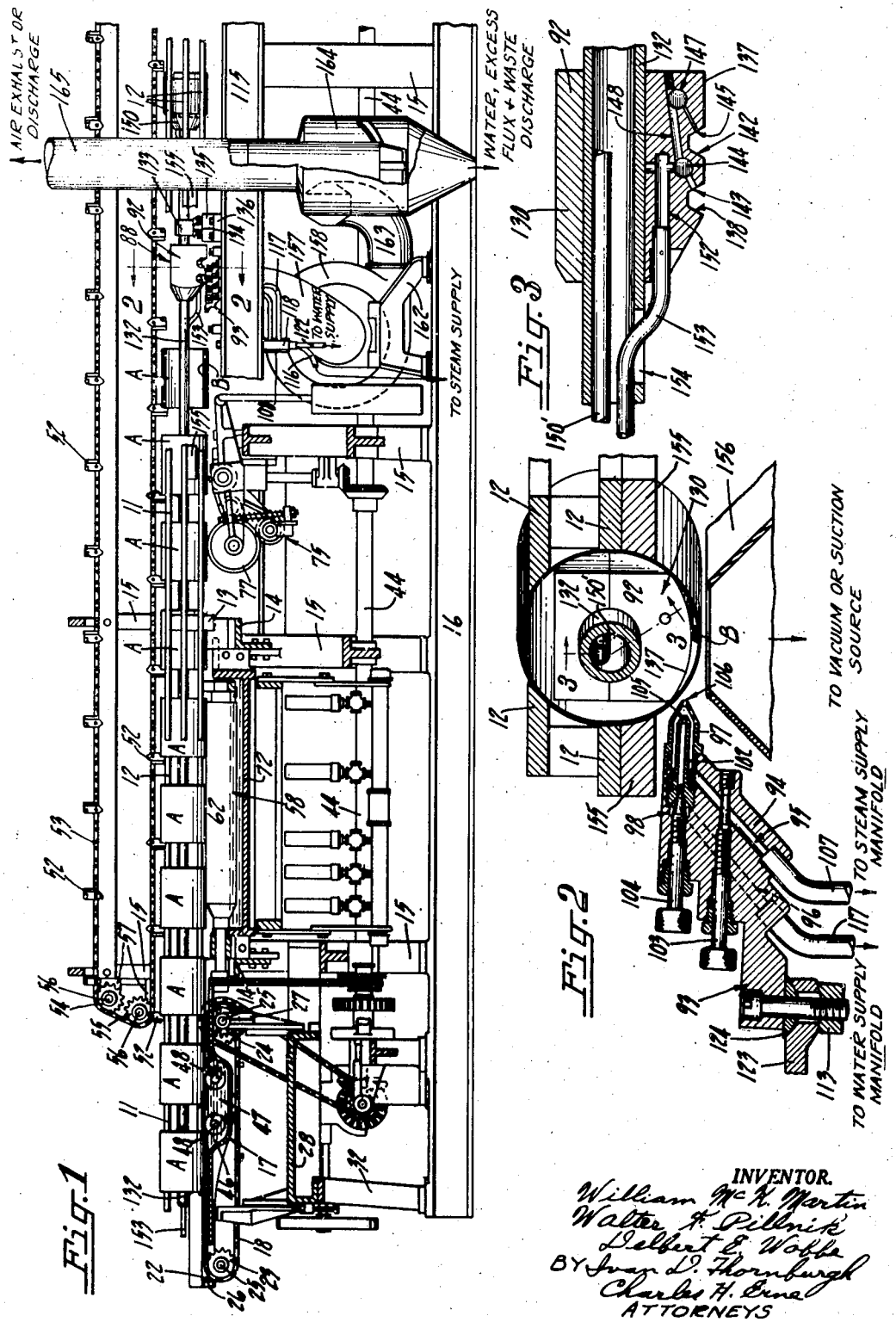
INVENTOR.
William McK. Martin
Walter F. Pillnik
Delbert E. Wolfe
BY Ivan D. Thornburgh
Charles H. Ernst
ATTORNEYS

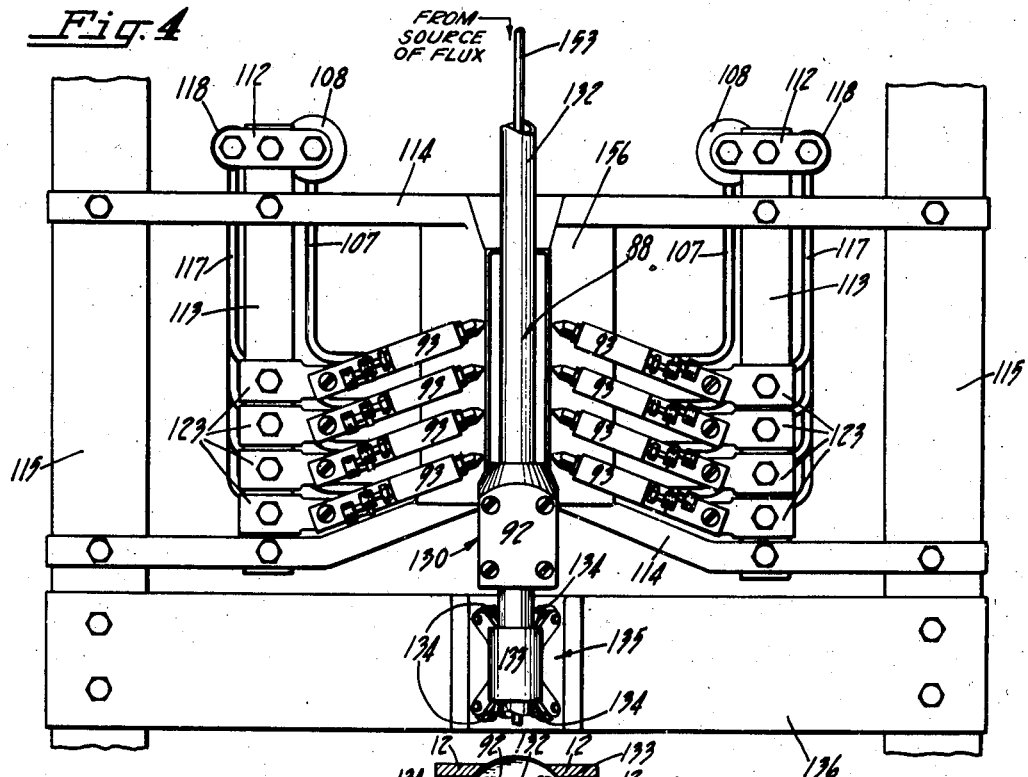

Patented Feb. 15, 1949

2,461,559

UNITED STATES PATENT OFFICE 2,461,559

APPARATUS FOR WASHING THE SIDE SEAMS OF CAN BODIES

William McK. Martin, River Forest, Walter F. Pillnik, Harvey, and Delbert E. Wobbe, Maywood, Ill., assignors to American Can Company, New York, N. Y., a corporation of New Jersey Application December 13, 1943, Serial No. 514,124

7 Claims. (Cl. 134—82)

1

The present invention relates to a machine for soldering the side seams of sheet metal can bodies and has particular reference to devices for removing excess flux and foreign material from the seams after they have been soldered.

In manufacturing sheet metal can bodies having soldered side seams, the seams usually are prepared with a fluxing material prior to the soldering operation. After having been soldered the seams are usually wiped off to remove excess solder. This wiping operation carries away most of the excess flux and other foreign material.

These operations are performed on the outside of the can bodies and have no effect upon material which may collect on the seam inside the bodies. In most cases the small quantity of such material left on a can body seam is negligble. However, where can bodies are to be used for certain purposes it is desirable to remove every trace of flux from the side seam before other subsequent operations are performed on the bodies.

The instant invention contemplates complete removal of the excess flux on a can body side seam from inside as well as from outside the body by means of liquid sprays having a high velocity fluid impeller that scours and washes away the flux and other foreign materials which may become baked or otherwise deposited onto the body as a result of the soldering operation, while the body moves along a path of travel through the sprays.

An object of the invention is the provision in a machine for soldering the side seams of can bodies of seam washing devices wherein a spray of a cleaning fluid is directed against the side seams of the can bodies as they pass along a path of travel on a horn of a soldering machine so that excess flux and other foreign material will be washed off the bodies.

Another object is the provision of such a washing device wherein the seam on the inside of the body is washed simultaneously with the washing of the seam on the outside of the body.

Another object is the provision of a washing device of this character wherein the can body parts adjacent the side seam are protected against the action of the cleaning fluid so that these parts may be kept dry.

Numerous other objects and advantages of the invention will be apparent as it is better understood from the following description, which, taken in connection with the accompanying drawings, discloses a preferred embodiment thereof.

Referring to the drawings:

Figure 1 is a longitudinal section of a machine embodying the present invention, with parts broken away;

Figure 2 is an enlarged fragmentary sectional view through a can body washing station in the machine shown in Fig. 1 along the line 2—2 and showing inside and outside spraying devices;

Fig. 3 is a sectional view taken substantially along the broken lines 3—3 in Fig. 2;

Fig. 4 is a top plan view of the can body washing station in the machine shown in Fig. 1, drawn to an enlarged scale, with parts broken away;

Fig. 5 is an end view of the washing station shown in Fig. 4 with parts broken away, parts in section; and Fig. 6 is an under side view of the inside spraying device shown in Figs. 2 and 3.

As a preferred embodiment of the present invention the drawings illustrate a can body soldering machine for making tubular metallic can bodies and is of the form fully described in the United States Patent No. 1,338,716, issued May 4, 1920, to M. E. Widell. In the instant invention previously prepared can bodies A are advanced continuously in a spaced and orderly procession in an outside horn 11 for fluxing and soldering a side seam B, which side seam thereafter is cleaned of excess or unusued flux and of other foreign material.

The outside horn 11 is of the usual type, made up of spaced bars 12 extending longitudinally of the machine. These bars are supported on brackets 13 carried on cross frames 14 secured to side frames 15 mounted on a main base 16 (Fig. 1). The can bodies A are fed along the horn 11 and through an initial or fluxing station 17 by an endless feed-in conveyor 18 having feed fingers 22 at spaced intervals therealong.

The conveyor 18 is located beneath the horn 11 and is at the left (as viewed in Fig. 1). This conveyor passes over suitable chain sprockets 23, 24 carried on studs 25 secured in brackets 26, 27. The brackets 26, 27 are supported on an intermediate frame 28 carried on an end frame 32 and side frame 15. The end frame 32 like the side frames 15, is mounted on the main base 16. The conveyor is operated in any suitable manner in time with the other moving parts of the machine, as for example, by way of a connection with a main drive shaft 44 as disclosed in the above mentioned Widell patent.

As the conveyor 18 advances the can bodies A along the horn 11, the bodies pass adjacent a flux pot 46 disposed at the fluxing station 17. This flux pot is located beneath the horn 11 and is supported on the intermediate frame 28. The flux pot preferably contains a liquid soldering flux 47 which is deposited onto the moving can body side seams B by rollers 48 rotatably mounted in this pot in the usual manner.

After passing through the fluxing station 17 the can bodies are picked off the conveyor 18 successively by feed fingers 52 carried at spaced intervals along a main endless conveyor 53. The conveyor 53 is operated above the horn 11 in time with other moving parts of the machine in any suitable manner. This conveyor passes over suitable chain sprockets, the conveyor taking over chain sprockets 54, 55 carried on studs 56 in brackets 57 which is secured to one of the side frames 15. The feed fingers 52 extend down between the bars 12 of the horn and engage the upper rear edge of the bodies for continuing their advancement along the horn.

Can bodies A moving along the horn 11, now pass through a second or soldering station 58 wherein the fluxed side seam is soldered in the usual manner by a solder roll 62 which rotates in a bath of molten solder contained in a reservoir 72 carried on the machine frame. This solder roll is rotated in the usual manner by connection with the main shaft 44.

Following the soldering of the side seam B the moving can bodies pass through a third or solder wiping station 75. A rotatable wiper wheel 77 located at this station wipes the excess solder from the outside of the side seam B. The wheel is rotated in any suitable manner from the main shaft 44 as shown in the Widell patent.

Following the solder wiping operation, the moving can bodies now pass through a fourth or can body side seam washing station 88 (Fig. 1). At this station provision is made for simultaneously washing both the inside and the outside of the can bodies at the side seam B with a cleaning fluid to remove the excess or residual flux from the surfaces of the bodies. The cleaning fluid used for this purpose preferably consists of a water and steam mixture which may be varied in desired proportions to produce substantially wet steam and dry steam, although the invention is equally well adapted for use with water and compressed air or water and gas mixtures, the steam, compressed air, or gas being utilized as high velocity impellers and the impeller being mixed with any other suitable cleaning fluid other than water, if desired.

The cleaning fluid is directed against the inside and outside surfaces of the can bodies adjacent the side seam B by an inside spray nozzle unit 92 and outside spray nozzle units 93 (Fig. 2). The outside spray nozzle units 93 are arranged to operate upon a moving can body in advance of the inside spray nozzle unit (see also Fig. 4) and thus will be described first.

There are eight outside spray nozzle units 93 and for the sake of brevity these units will be referred to broadly as nozzles. The outside nozzles are arranged in two groups of four, one group being disposed on each side of the horn 11. These spray nozzles or nozzle units may be of the commercial variety and each unit comprises a body 94 (Fig. 2) having a channel 95 for incoming steam and an adjacent channel 96 for water. At its outlet or nozzle end, the steam channel 95 communicates with the interior of a substantially horizontal outer nozzle shell 97 which is threaded in the body 94. The outlet end of the water channel 96 communicates with a chamber 98 formed in the nozzle body and located at the inner end of an inner nozzle shell 102 threaded in the body inside the outer nozzle shell 97.

The quantity of steam passing through the steam channel 95 and into the outer nozzle shell 97 is regulated by a manually operated injector valve needle 103. Likewise, the quantity of water entering into the inner nozzle shell 102 from the channel 96 is regulated by a manually operated injector valve needle 104.

Hence the amount of water passing through a nozzle opening 105 in the inner shell 102 for mixing with a predetermined quantity of steam in the outer nozzle shell may be changed for producing a desired mixture of wet steam or a comparatively dry steam composing the cleaning fluid. The desired mixture of cleaning fluid thus obtained passes through a nozzle opening 106 in the outer valve shell 97 and is sprayed directly against an advancing can body moving into the washing station 88. In this manner a wet steam mixture may be sprayed at high velocity from the leading nozzles proper in each group to dissolve, scour, and dislodge adhering excess flux and other foreign material which may be baked or otherwise deposited on the can body as a result of the soldering operation while a steam mixture which is not so moist may be sprayed from the remaining nozzles to rinse and even partially dry the moving can body. When compressed air or gas is used as an impeller for the spray the can surfaces may be completely dried.

Steam for the cleaning fluid is supplied to an inlet end of the steam channel 95 (Fig. 2) of each of the nozzles by pipes 107 which are secured in the nozzle bodies. These pipes lead from steam manifolds 108. There are two such manifolds, one on each side of the machine and they are suspended vertically from short bars 112 carried on longitudinal rails 113 (Figs. 4 and 5). The rails 113 are bolted near their ends to cross rails 114 mounted on channel beams 115 carried on the machine frames 15. A supply of steam is fed by pipes 116 to the manifolds 108 from any suitable source of supply.

The water is supplied to the inlet end of the water channels 96 of the nozzle units by pipes 117 which are secured in the nozzle bodies 94. These pipes lead from water manifolds 118. There are two such manifolds one on each side of the machine adjacent the steam manifolds 108 and these too are suspended vertically from the bars 112. A supply of water is fed by pipes 122 to the manifolds 118 from any suitable source of supply.

Provision is made in the instant invention for setting the spray nozzles 93 in a predetermined position relative to the can body side seams (Figs. 2, 4 and 5) of the bodies moving along the horn 11. For this purpose a swivel mounting 123 is provided for each of these spray units. Each mounting is formed with a concave seat for the reception of a dome-shaped element or washer 124 which is bolted between the mounting 123 and the body 94. The swivel mountings 123 are secured to the longitudinal rails 113.

The inside spray nozzle unit 92 is formed in a block member 130, which may or may not be made in two parts, to facilitate clamping it in position on a tube 132, located inside the horn. The tube 132 extends longitudinally of the machine and back towards the entrance end of the machine to a place where the side seam of the body is still open as is usual in can body manufacture. The tube at the end in the washing station 88 is supported in a bracket 133 (see also Fig. 1).

The bracket 133 carries a plurality of support rollers 134 which normally engage against a curved support shoe 135 disposed adjacent the horn 11 and formed at the center of a cross bar 136 (Figs. 4 and 5). The cross bar is secured to the channel beams 115. The tube 132 with the inside spray nozzle unit 92 thus is permitted to float and provide passage for the can bodies A as they move by and beyond this inside nozzle unit in their advancement along the horn.

The inside unit block member 130 preferably is formed with a curved bottom or under side 137. This is best illustrated in Fig. 2 where the mid or central section of the curved bottom is bridged across and clear of the side seam B while the opposite or outer sections of the curved bottom engage the inside surface of each can body. This forms a shield and protects the remaining inside surface of the body. This curved bottom has two transverse grooves 138, 142 cut therein (see also Figs. 3 and 6). These grooves provide clearance for the outlet ends of two sets or rows of nozzle orifices 143, 145 formed in the block member 130.

The orifices 143 open out into the groove 138 and are spaced comparatively close to each other. There are five such orifices and they extend forward, in the direction of travel of the can bodies along the horn, into a transverse channel 144 formed in the block member.

The orifices 145 open out into the groove 142 and are smaller in diameter and are spaced further apart than the orifices 143. In this group there are five orifices 145. In addition and at the two ends of this row of orifices are two larger orifices 146, the latter being of the same diameter as the orifices 143. The orifices 145, 146 extend forward through the block member at an angle and communicate with a transverse channel 147 formed in the member.

The transverse channels 144, 147 have communication with each other by way of a channel 148 and the channel 144 also communicates with an inlet channel 152. One end of the inlet channel 152 leads from the open end of a pipe 153 which is secured in the block member 130 (Fig. 3). This pipe extends through the center of the tube from its rear end and where it passes into the nozzle block it dips down through an opening 154 in the tube 132. This is a supply pipe and leads from a suitable source of cleaning fluid, such as water, or the fluid may be a mixture of steam and water.

Hence the cleaning fluid supplied to the nozzle 92 is forced out of the orifices 143, 145, 146 in a series of concentrated jets or sprays of the fluid. The jets of fluid from the first set of orifices 143 strike against the inside of the can body at the side seam, as the body is moving past, and dissolve, scour, and remove any adhering excess flux on the inside of the body. As the can body continues its advancement the second series of jets of fluid from the second set of orifices 145, 146 strike the body seam. The jets from the orifices 145 are finer and less concentrated while the coarser sprays from the orifices 146 confine the curtain of spray from the finer sprays. This second set of jets is for the purpose of removing free water and foreign matter remaining on the inside surface of the can body.

Since excess flux on can bodies is confined largely to the region of the side seam, it is desirable to direct the cleaning to this region and to keep the remainder of the body dry during the washing operations just described. On the outside of the can bodies this is done by outside shields or plates 155 (Figs. 2 and 5) disposed on opposite sides of the path of travel of the bodies. These shields protect the major portion of each body from the spray of the outside nozzles 93. The outside shields may be supported in any suitable manner on the horn bars 12. The body construction of the inside nozzles 92 inherently lends itself to protection of substantially all of the inside surface of the can bodies above the opposite ends of the curved bottom 137, as hereinbefore explained, and thus requires no other shield.

In some cases it is or may be desirable to completely dry the inside surfaces of the moving can bodies. For this purpose a drying head 150 (Figs. 1 and 6) is located adjacent the inside spray nozzle unit 92. The head is threadedly carried on the outer end of the tube 132 and is formed with a sealed chamber which communicates with a fluid impeller pipe 150' which extends back through the tube adjacent the pipe 153 to the source of impeller. Discharge orifices 150'' formed in the head at an angle to the path of travel of the can bodies along the horn, communicate with the chamber. There are a plurality of these orifices arranged in a circle around the inner face of the head.

Hence the drying fluid, dry steam, compressed air, or gas as the case may be, supplied to the chamber by way of the pipe 150', issues from the discharge orifices 150'' and impinges at high velocity against the inside surface of the body and sweeps out any residual droplets of the cleaning fluid, leaving the surface dry.

Following the washing of the can bodies at the station 88 (Fig. 1) the bodies are in condition for removal from the instant machine for deposit onto an adjacent machine or other suitable place of discharge. This is effected by continued movement of the bodies along the horn 11 following which they are discharged toward the right (as viewed in Fig. 1).

The used or spent cleaning fluid, excess flux and other waste matter removed from the can bodies at the washing station 88, is held under control against spattering onto adjacent can bodies and parts of the machine by vacuum which draws these waste materials down into a receiving means 156. This receptor is located directly beneath the body horn 11 (Figs. 2 and 5) and is suspended from the cross rails 114. The vacuum is created in a suction manifold 157 connected to the lower end of the receptor and in turn leading to a suction device or fan 158 (Fig. 1).

The suction device 158 is located beneath the washing station and is supported on legs 162 mounted on the main base frame 16. This suction device may be operated in any suitable manner from the main shaft 44. The waste materials thereafter are discharged through a pipe connection 163 into a cyclone separator 164. In this separator the water, excess flux and other waste materials are discharged from the bottom while the air is discharged from a pipe 165 extending upwardly from the separator and leading to a suitable place of exhaust.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for making tubular sheet metal can bodies each having a soldered side seam, the combination of a support for the soldered can bodies, means for advancing can bodies along said support, and a spray nozzle member located adjacent said support for spraying a cleaning fluid onto the side seams on the interior of the can bodies advanced past and over said nozzle member for washing from the bodies any excess soldering flux and other foreign materials that may adhere to the side seams as a result of a seam soldering operation, adjacent wall portions of said member constituting a shield disposed contiguous to the inside of the can bodies adjacent their side seams for protecting the major portion of the can bodies against said spray of cleaning fluid and for limiting the action of the cleaning fluid to the side seam areas of the can bodies.

2. In a machine for making tubular sheet metal can bodies each having a soldered side seam, the combination of a support for the soldered can bodies, and a spray nozzle located adjacent said support and having a transverse row of spray orifices, including a plurality of fine spray orifices with a coarse spray orifice disposed at each end of the row for confining a curtain of spray from the fine spray orifices for spraying a cleaning fluid onto the side seams on the inside of can bodies moved past said nozzle for washing from the bodies any excess soldering flux and other foreign materials that may adhere to the side seams as a result of a seam soldering operation.

3. In a machine for making tubular sheet metal can bodies each having a soldered side seam, the combination of a longitudinally disposed horn support for the soldered can bodies, a conveyor for advancing said can bodies on their longitudinal axes and while on their sides along said support, a plurality of spray nozzles located adjacent said support for spraying a mixture of steam and water onto the side seams exteriorly of the can bodies advanced past said nozzles, steam and water manifolds connecting with each of said spray nozzles for supplying steam and water separately to the nozzles, and manually operable valve means in each of said nozzles for controlling the amount of steam and water supplied to the nozzles for regulating the mixture of the spray discharged therefrom so that some of the nozzles may be set for a wet mixture to dissolve, scour, and dislodge from the bodies any excess soldering flux and other foreign materials that may adhere to the side seams as a result of a seam soldering operation, while other of said nozzles may be set for a dryer mixture to rinse and partially dry the washed can bodies.

4. In a machine for making tubular sheet metal can bodies having soldered side seams, the combination of a longitudinally disposed horn support for the soldered can bodies, means for advancing can bodies on their longitudinal axes while on their sides along said support with their side seams disposed and maintained in predetermined position, a spray nozzle disposed laterally of said support for spraying a mixed cleaning fluid onto the side seams exteriorly of the can bodies moved past said nozzle for washing from the bodies any excess soldering flux and other foreign materials that may adhere to the side seams as a result of a seam soldering operation, a receptor disposed below said nozzle for receiving the used cleaning fluid as it drains from the sprayed bodies, a suction manifold leading from said receptor, a suction device connecting with said manifold for drawing the used cleaning fluid into and away from said receptor, and a separator connecting with said suction device for separately discharging the constituents of the spent cleaning fluid.

5. In a machine for making tubular sheet metal can bodies having soldered side seams, the combination of a longitudinally disposed horn support for the soldered can bodies, a conveyor for advancing the can bodies on their longitudinal axes along said horn support with their side seams at the bottom, and a plurality of spray nozzles located in a plane below said support and disposed on opposite sides of the path of travel of the advancing can bodies and in the horizontal plane of the side seams thereof, said nozzles being arranged at an angle to said path of travel for more effectively spraying a cleaning fluid onto the side seams on the outside of can bodies moved past said nozzle for washing from the bodies any excess soldering flux and other foreign materials adhering to the side seams as a result of a seam soldering operation.

6. In a machine for making tubular sheet metal can bodies each having a soldered side seam, the combination of a longitudinally disposed horn support for the soldered can bodies, means for advancing can bodies on their longitudinal axes while on their sides and along said support with their side seams disposed and maintained in predetermined position, and a spray nozzle located adjacent said support and having a plurality of rows of spray orifices, the orifices of one row being of a different size from those of another row for spraying a fluid onto the side seams on the inside of can bodies moved past said nozzle, the fluid from the row of larger spray orifices serving to dissolve, scour and remove from the can bodies any excess soldering flux and other foreign materials that may adhere to the side seams as a result of a seam soldering operation, and the fluid from the row of smaller spray orifices serving to rinse off the cleaned can bodies with a finer sharper spray.

7. In a machine for making tubular sheet metal can bodies having soldered side seams, the combination of a longitudinally disposed support having means for advancing the freshly soldered can bodies on their longitudinal axes therealong with their side seams disposed in predetermined position, a spray nozzle located at one side of said support for spraying a cleaning fluid onto the exterior of the can body side seams moved past said nozzle for washing from the bodies excess soldering flux and solder particles adhering to the side seams as the result of the seam soldering operation, and a shield on said support adjacent said spray nozzle for restricting the application of the cleaning fluid spray to the side seams of the advancing can bodies to protect the major surface of the can bodies from contact with the cleaning fluid, said shield extending along the length of and in close proximity to the can body.

W. McK. MARTIN.
WALTER F. PILLNIK.
DELBERT E. WOBBE.

REFERENCES CITED

The following references are of record in the file of this patent:

UNITED STATES PATENTS

| Number | Name | Date |
|---|---|---|
| 595,705 | Fellows | Dec. 21, 1897 |
| 704,256 | Hodgson | July 8, 1902 |
| 732,005 | Leiger | June 23, 1903 |
| 988,693 | Chalmers | Apr. 4, 1911 |
| 1,106,579 | Orr | Aug. 11, 1914 |
| 1,123,081 | Bowser | Dec. 29, 1914 |
| 1,192,645 | Koerting | July 25, 1916 |
| 1,508,076 | Taylor | Sept. 9, 1924 |
| 1,567,693 | Allen et al. | Dec. 29, 1925 |

(Other references on following page)

UNITED STATES PATENTS

| Number | Name | Date |
|---|---|---|
| 1,652,654 | Wolfinger et al. | Dec. 13, 1927 |
| 1,687,791 | Price | Oct. 16, 1928 |
| 1,730,348 | Anstiss | Oct. 10, 1929 |
| 1,768,887 | Chase et al. | July 1, 1930 |
| 1,810,511 | Wolfinger | June 16, 1931 |
| 1,871,666 | Dallas | Aug. 16, 1932 |
| 2,065,466 | Horn | Dec. 22, 1936 |
| 2,067,838 | Girton | Jan. 12, 1937 |
| 2,188,717 | Jones | Jan. 30, 1940 |
| 2,216,698 | Arey et al. | Oct. 1, 1940 |
| 2,301,188 | Bard | Nov. 10, 1942 |
| 2,327,986 | Bach | Aug. 31, 1943 |

FOREIGN PATENTS

| Number | Country | Date |
|---|---|---|
| 286,522 | Great Britain | Mar. 8, 1928 |